March 17, 1953 — G. SUGANO — 2,631,307
DEVICE FOR AUTOMATIC HONEY EXTRACTION FROM COMBS
Filed Jan. 13, 1950 — 4 Sheets-Sheet 1
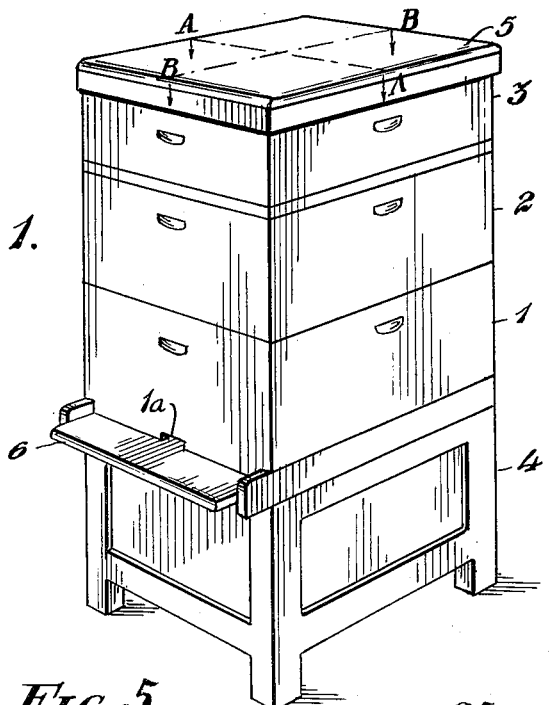
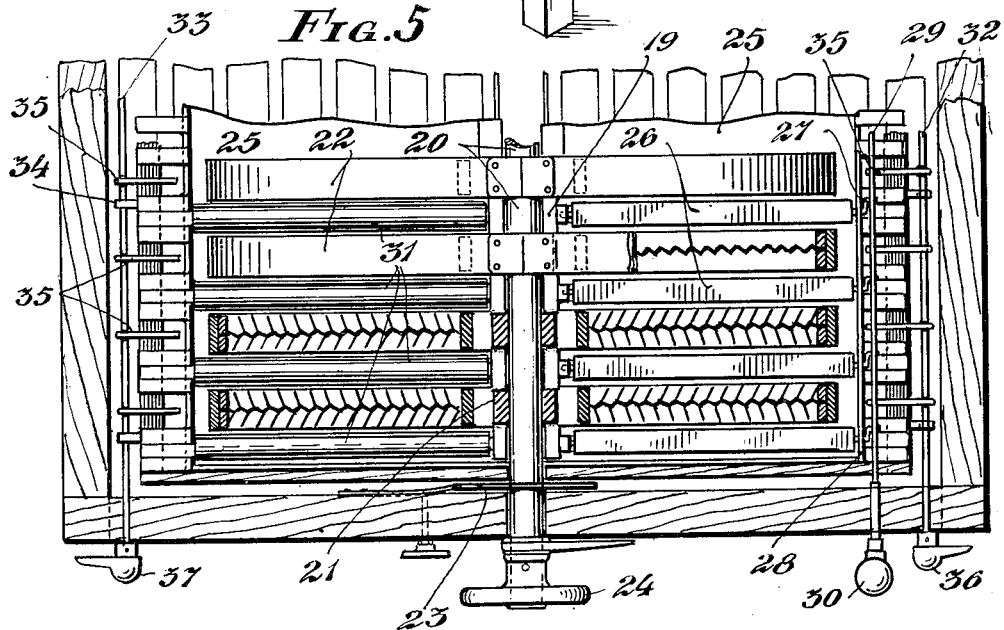
INVENTOR
GENJI SUGANO
By Linton and Linton
ATTORNEYS

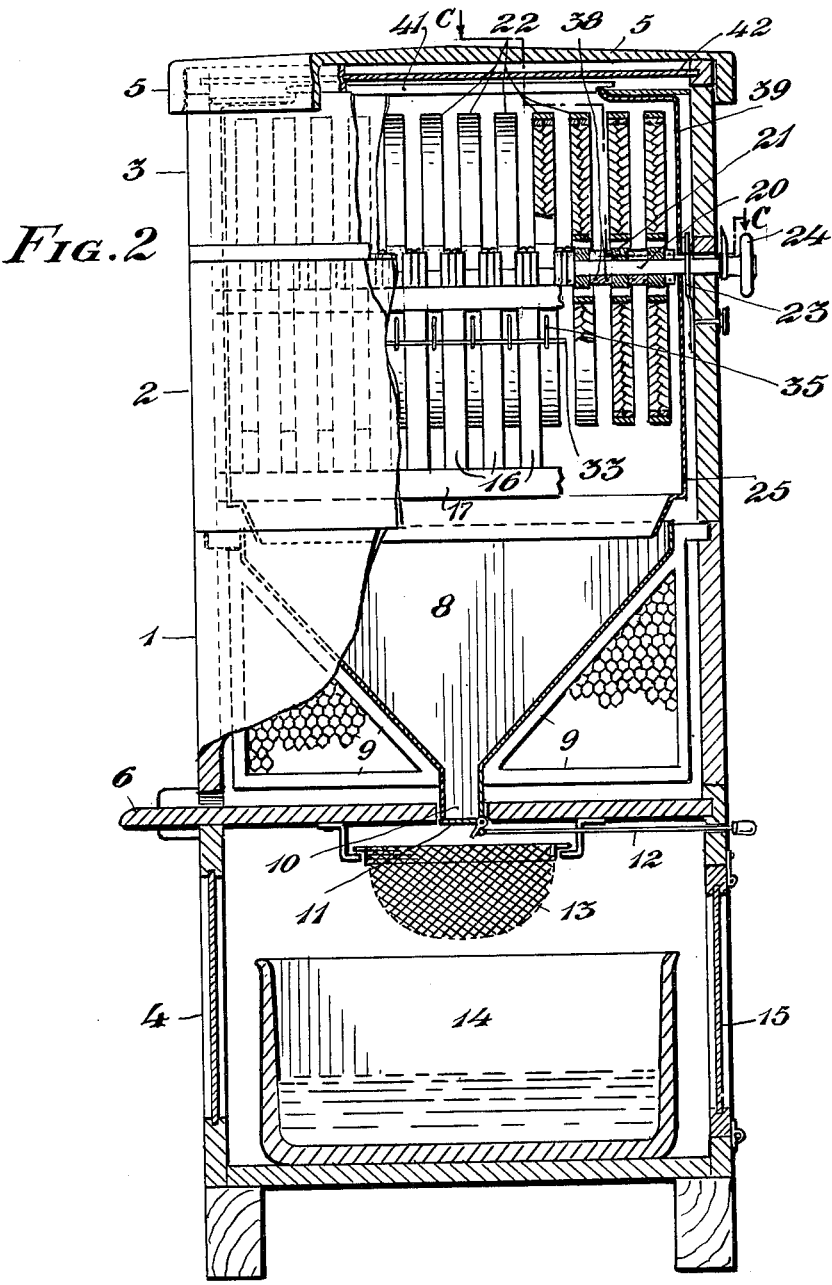

March 17, 1953 — G. SUGANO — 2,631,307
DEVICE FOR AUTOMATIC HONEY EXTRACTION FROM COMBS
Filed Jan. 13, 1950 — 4 Sheets-Sheet 3
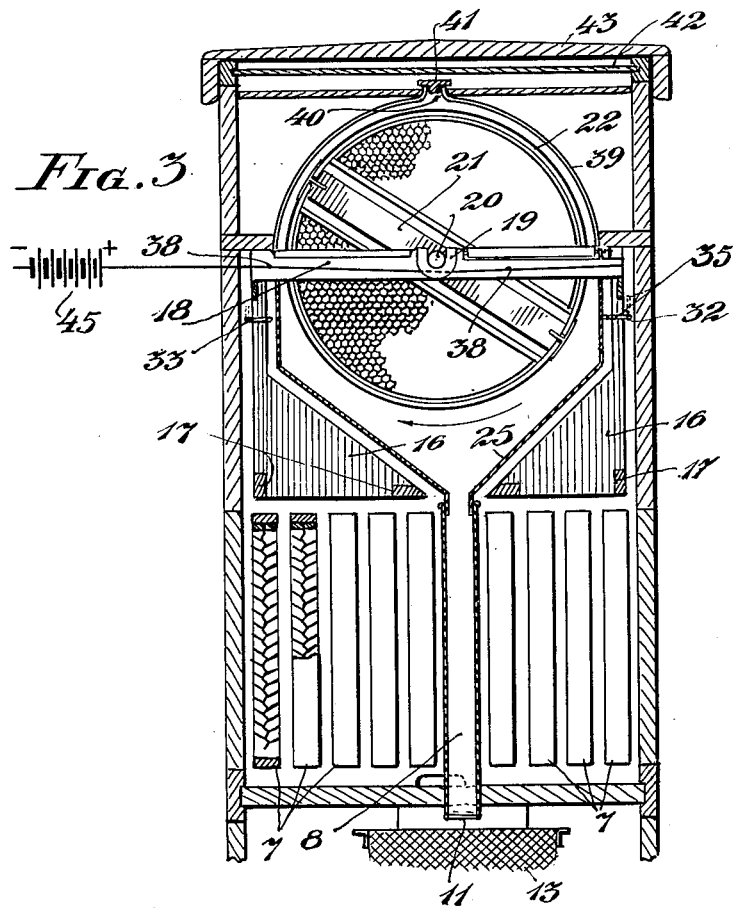
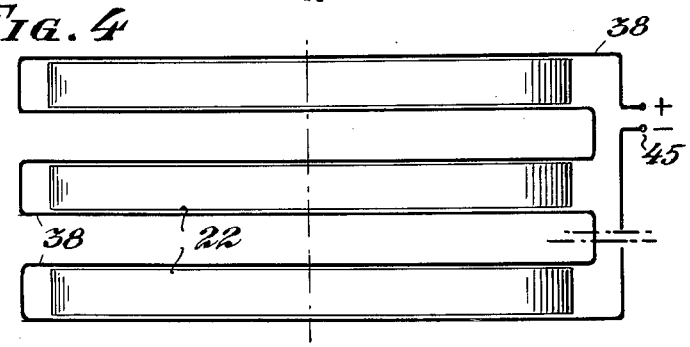
INVENTOR
GENJI SUGANO
By Linton and Linton
ATTORNEYS

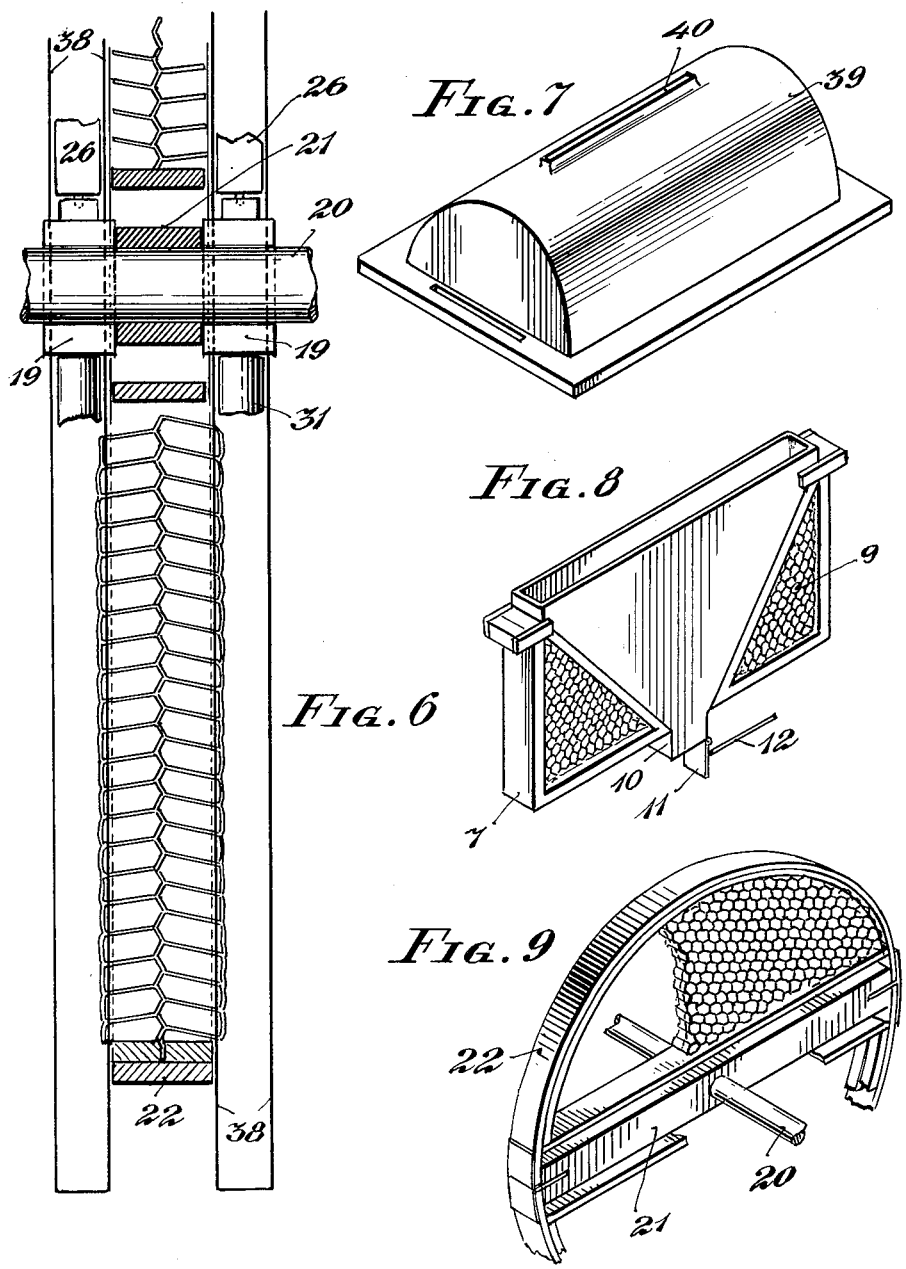

Patented Mar. 17, 1953

2,631,307

UNITED STATES PATENT OFFICE 2,631,307

DEVICE FOR AUTOMATIC HONEY EXTRACTION FROM COMBS

Genji Sugano, Buenos Aires, Argentina

Application January 13, 1950, Serial No. 138,737

8 Claims. (Cl. 6—2)

This invention relates to a device adaptable to any type of hive, for extracting honey automatically from combs, without necessity of taking out the combs from the hive, said combs being populated and at full internal and external work, when the honey extraction takes place, the operation causing no damage to the life and natural working habits of the bees, but on the contrary, offers the best and more ample condition of comfort and adaptation to the peculiar character of these insects. Moreover, according to the practice of industrial and productive bee keeping it is known that only the ripe honey should be extracted; with this device it is impossible, even if desired, to crop unripe honey, for only the ripe honey of sealed cells is extracted, while with common extracting method by centrifugal force, ripe honey is extracted inevitably mixed with unripe honey. The more peculiar quality of this device is that it replaces instantaneously and automatically the empty store (super with empty combs), ready to be used as deposit for the nectar gathered by bees. The operations this device does in the hive are: extracting, filtering, bottling honey and replacement of empty combs. All these operations are done automatically, without the need of opening the hive, thus obtaining the product aseptically and without making bees angry. Furthermore, this device is applicable to any type of hive.

The needs of practical order that lead to this invention are:

1. There are always many people interested in having hives to obtain honey by means of their own hands, or to study the life and custom of bees in order to improve production; there are also many people who only wish to have a hive to satisfy their own need. But all strike against difficulties that discourage them, such as lack of comfort, troubles in acquiring all necessary implements, or ignorance of methods necessary to extract honey. This hive does by itself and automatically all these operations, necessary to extract honey and thus all these obstacles disappear.

2. This device, improved in accordance with an economic method, is very useful and practical for bee keeping in general, for the following reasons: (a) as, according to the description, the hive equipped with this device can extract honey from combs automatically, there is no need of extractor and tools indispensable at present for honey crop, such as the uncapping knife, boiler, burner, fuel, etc.; nor a place destined for extracting, and disposable supers with empty combs, etc., etc., which are generally indispensable and need a big capital. Besides, all manual work that usual honey extracting method require is abolished. (b) Another advantage of this device consists in that it can be applied to any type of hive, only modifying the frame form. The illustration shows the device applied to a standard type hive, for this is the type that is used more for industrial purpose.

As to the advantages of the auto-extracting hive, the following may be pointed out: (a) As the honey is extracted automatically in the inhabited hive itself, there is no need of extracting apparatus, nor of effecting any of the operations that actually are indispensable for extracting; (b) it does not need a special place for uncapping and extracting, and also for the preparation of the corresponding implements; (c) there is no need of having a plurality of supers with empty combs for each hive, for the material gathered by bees; (d) settling of extracted honey is not necessary, for only ripe honey is extracted; (e) the peculiar extracting system of this hive allows to crop ripe honey at any moment when wanted, provided that there are sealed cells in the combs of deposit super; the extracting operation being possible even if there are many unsealed cells containing unripe honey, for the unripe honey remains in the cells, which permits those with whimsical desires to get honey at any moment during honey flow without waiting until the whole extension of combs is sealed; (f) by the capabilities of the device of cropping only ripe honey, the product is obtained completely according to the ethics of the productive bee keeping; (g) the work of carrying, putting, taking away and bringing supers in the extracting operation is eliminated, for this hive, when the combs are emptied, replaces automatically other empty combs to be used as deposit supers; (h) the honey is filtered and put into the containers in the hive itself; (i) by this advantageous cropping there is no need of opening the hive and therefore, when cropping, bees are not irritated, and the stings and other troubles that bees are likely to cause frequently are completely avoided; (j) by means of this method the crops increase enormously its production through psychological reasoning of the bees, as, effectively, bees finding their combs empty without apparent cause, and without anything that orientates them, remain in a great confusion for a moment, but are soon impelled to restore their disappeared provision to the deposits, working with more haste than before. This fact is observed in the common methods, but is seen more in this system;

(k) some time before a great honey flow, a great swarming is noticed in the hives, and so the greater part of the technique of productive bee keeping consists in avoiding this tendency; but this symptom is not observed in the present case, owing to the fact that bees are dispersed through the numerous bee passages that form the framework of this dispositive, thus overcoming another difficulty in the honey crop; (l) about smoking: before extracting, the smoke is sent through the mouth of the funnel that protrudes inside the boxed support; the smoke passes through the funnel that connects to the interior of the extracting tank and enters only to the deposit super, dispersing bees from here without disturbing the bees in the brood chamber; (m) regarding the entrance of queen bees, this hive has the great advantage of easy manipulation and better result owing to the construction of the device, and also permits two queen bees to stay at the same time, placing a super over the device, in which super the queen bee must be entered in case of necessity; (n) when it becomes necessary to feed the hive, the cased support allows this operation to be effected with great care, using for the hive a feeder that is easily applied by the interior part of this support, and combining said feeder with an opening in the bottom, which serves for passing the outlet end of a funnel type frame, without intruding upon the seed and the subsequent bother of the excited insects and robbery from other hives, carried out by the robber bees attracted by the feverish activity the food produces. This can be the cause of a total extermination of the bee population. The feeding step is of the most delicate and one that may cause serious drawbacks in the care of the hive, for it requires a very accurate and delicate procedure. (o) The fusing of the colony has an extraordinarily extensive character and is obtained by adding to the storing super covered with a semi-cylindrical lid, the super of the colony which is desired to add. The opening that said lid has in its central upper part automatically produces this fusing, and if the lid is of wire web even better results are obtained. (p) This device is applicable to any type of hive used in any part of the world, with only modification of size and shape of the spacing-walls that form the framework.

Resuming the technical means that solve the problem are: (a) when the combs are placed in the hive, in their natural position, the cells are inclined from 5°30′ to 12°30′ upward, with which their mouths are higher than the bottoms. Owing to this position and the capillary attraction, the honey remains in the cells. It would appear that, when the position of the comb is inverted, the honey should be poured out; but, this does not happen, for neither ripe nor unripe honey (which is more fluid) pours out. This is due to the capillary attraction. This has been tested by taking a comb of worker-bees' cells (that have 27 cells per sq. in.), with ripe honey and once uncapped taking away the capping was inverted from its natural position. The honey did not drip owing to the capillary attraction. But if, instead of the anterior, a comb with drones' cells is inverted, it will be noted that the unripe honey overflows, owing to its fluidity and the size of the cells (for here are only 16 cells per square inch in these combs). Now if instead of all the former, a comb is uncapped so that the capping be adhered to the cells entrances; touching the capping to these openings and the combs are inverted, the capillary attraction is prevented and thus the honey drips from the cells. Thus applying the physical principle above mentioned, the honey can be extracted without the use of centrifugal force extractors. If unripe honey is not sealed, it will remain in the cells by the capillary attraction, while if the extractor is used it will run out together with the ripe honey, with which the product must remain quiet for a settling period of 15 to 20 days, in order that the water contained by the unripe honey is evaporated. Furthermore, by using extractor the combs, which are the more expensive items in be keeping, are sometimes broken. It must be reminded that the bees consume from 7 to 15 pounds of honey to construct a pound of comb and if we add to this the loss of time to gather and elaborate the raw material, and if we consider the time that is lost in this work, it can be realized that the combs are, as abovementioned, the most expensive items of the business. With the present invention the combs are completely out of danger of being broken, and a higher percentage of product is obtained with less cost and work. According to the invention a circular frame is built of two semi-circular parts, joined by means of a diametral bar, this bar having a central hole by which a supporting axis passes permitting the frames to turn within the hive thus making all the abovementioned operation.

An embodiment of the invention shall be hereinafter described as a non limitative example, and referring to the accompanying drawings in which:

Fig. 1 shows a general view of the hive.

Fig. 2 is an enlarged detailed view of the hive with the cover broken away and parts in section taken on line A—A of Fig. 1.

Fig. 3 is an enlarged sectional view of the hive on line B—B of Fig. 1.

Fig. 4 shows a top view of the frames surrounded by the uncapping device.

Fig. 5 is an enlarged fragmentary sectional view taken on line C—C of Fig. 2.

Fig. 6 is an enlarged fragmentary diametral sectional view of a frame.

Fig. 7 is a perspective view of the inner semi-cylindrical cover of the hives.

Fig. 8 shows the botom central frame, having a collecting funnel.

Fig. 9 shows an upper circular frame.

A number of square boxes, that in this particular case are three, 1, 2 and 3 of Fig. 1 are placed on a closed support 4, and over the uppermost of said boxes is placed a square lid 5. Between the bottom box 1 and the support 4 there is a tray 6, which protrudes from it to form the alighting board, and a small entrance hole 1a is provided on the lower side of box 1.

In box 1 the brood chamber is placed, having quadrilateral frames 7, Fig. 3. The center frame of this chamber takes the form of a funnel 8, Figs. 2 and 8 of substantially triangular profile, and the same width of the rest of the frames 7 in the chamber. The spaces at both sides of the funnel 8 are occupied by combs 9. The narrow lower end of the funnel is prolonged by a tube 10, which passes through a corresponding hole in the tray 6, and has at its end a plane valve 11 which is actuated from outside by a lever and a rod mechanism 12.

On the underside of the tray 6, a removable filter 13 is placed, and below this filter, and resting on the support 4 there is a container 14 which can be removed from the support through a hinged door 15.

The two upper boxes 2 and 3 contain the specially designed extracting super which is basically formed by a fixed and a moving part. The fixed part is formed mainly by a frame work constituted of spacer walls 16 supported on transversal beams 17 and placed apart in the box. On the upper part of the elements 16, and resting on the heads of two opposed elements, there are a number of cross beams 18 having in their center part a semi-circular support 19 each, for a revolving shaft 20. On shaft 20 there are mounted by a diametral hub 21 a number of circular frames 22. Each of said circular frames 22 is divided into two semi-circular zones by the diametral hub 21, which are filled with combs. At one end of shaft 20 there is placed a stopping device 23 and on the outside of the box a circular handle 24 with an indicating needle is provided.

Surrounding the lower half of the circular frames 22 there is an extracting tank 25 which communicates with the funnel 8. Between each successive circular frame 22 there is horizontally placed a rectangular metal sheet 26 which occupies nearly all the space between said frames, said sheet being rotatable by having a housed pin at one end and a crank 27 which passes through a supporting element 28 secured to the spacer walls 16. The ends of the cranks 27 are all secured to a rod 29 which can be operated by a knob 30 from the outside of the box, in such a way that by pulling said knob 30 all the sheets 26 rotate leaving a space of sufficient width so that the workers are able to pass.

On the other side of frames 22 and in the same level with sheets 26, the spaces between frames are occupied also by the element 31, which are fixedly mounted and profiled in the form of two parallel semi-cylinders with the convex side placed upwards. The width of these elements is such that they almost touch the circular frames 22, leaving thus practically no free space between said elements and the frames.

On both sides of the box, running parallel to the shaft 20 on the whole length of the box, but at a slightly lower level, there are two rods 32 and 33 which are rotatably mounted on a number of supports 34 placed on spacer walls 16. Fixedly mounted on said rods 32 and 33 perpendicular to them and corresponding with the spaces between the spacer walls 16, there are a number of small rods 35, which when horizontally placed occupy said spaces in such a way that only the workers can pass. When it is desired to give a free entrance to all the bees to the upper chamber, the rod 32 and 33 are rotated by means of the knobs 36 and 37 so as to free the spaces from the rods 35.

Another important feature is the provision of a thin uncapping wire 38 placed on the cross beams 18 on the underside of the elements 26 and 31. Said uncapping wire is placed at such a distance from the circular frames 22 so that by rotation of them the honey cells become uncapped. In order to facilitate this, the wire 38 is heated by an electric current so that the comb wax is melted away by the wire when they come in close contact.

On top of the whole embodiment described, a semi-cylindrical cover 39 (Fig. 7) is placed, having on its upper part a slot 40 closed by a stopper 41. Over this cover, and suported by the upper box 3 there is an inner cover 42 and lastly the outer lid 5 is placed.

We shall now describe how the apparatus works:

Once the hive is populated, the bees go to the upper part of the deposit super through all the spaces between the spacing walls 16, beginning to construct combs on the semi-circular frames 22. The bees that work in this super cannot enter in the extracting tank, for the entrance is barred by the elements 26 and 31.

For extracting the honey, the door 15, which the closed support 4 has in its after part is opened and through the mouth of the funnel 10 smoke is sent by a bee smoker; the smoke penetrates in the deposit super passing through the interior of the extracting tank 8 and through the narrow spaces between the frames 22 and beams 18, which allows the smoke to pass but not bees; thus the smoke reaches the deposit super without troubling the bees that work in the brood chamber. Once the bees are driven out from the deposit super toward the brood chamber, the handle 30 of the regular of the rotary elements 26 is pulled out permitting the capping that protrudes from the level of the frames 22 to pass. Once said elements 26 are opened the brake 23 is released, and the shaft 20 carrying the frames 22 is rotated by means of the handle 24, toward the side where the rotary elements 26 are, almost without using force for the weight of the honey contained in the comb accelerates the rotary movement, which is indicated by a pin placed for the purpose in the handle.

On revolving the frames 22 the combs with honey of the deposit super, pass down to the extracting tank where it remains in an inverted position, while the empty combs, that were in the inverted position in the extracting tank before, now go up to the deposit super thus returning to their natural position, ready to be used as deposits for the bees. On revolving the frames 22, the capping that excels approximately 2 mm. the thickness of said frames passes over the uncapping wire 38 that is at the level of said frames 22, uncapping thus automatically, but the capping remains adhered to the mouth of the cells, without changing the former position. The weight of honey, once the combs reached the interior of the extracting tank 8, stops the rotation of the shaft 20, which is held fast automatically by means of the brake device 23 on arriving to the correct position. Immediately, by pushing the handle 30 of the rotary elements 26, these return to their former position, in order to avoid the passing of bees to the extracting tank 8. With the capping remaining adhered to the mouths of the inverted cells, the capillary attraction of the honey contained in the cells begins to break down.

On beginning to revolve the frames 22 the uncapping wire 38 may be heated at about 100 degrees by connecting it to a storage battery or other electric source 45 with which the uncapping of the cells is obtained by melting the wax on its point of contact with the wire. Finishing the rotation of the frame 22 the smoke that entered in the deposit super, having fulfilled its mission of dislodging bees, disperses and the bees return to said deposit super, again deposit honey in the combs and the same process will be repeated when the combs are sealed. The honey, extracted by means of the physical phenomenon of the destruction of capillary attraction mentioned above, falls to the bottom of the extracting tank 25 and passing through the funnel frame 8 and the filter 13 enters in the container 14 placed in the interior of the cased support 4. After 5 or 6 days the capping falls by itself to the bottom of the extracting tank 25 and from there to the filter 13 carried by the honey extracted in the next occasion. If difficulty arises in the elimination of cappings, the mouth 10 of the funnel 8 can be shut by valve 11 and the elements 26 are opened permitting thus the bees to pass to the extracting tank 25 for about half an hour. The bees have the habit of cleaning the place where honey is smeared slightly and when it is not the right place for the honey to be so they make powder of the cappings, which falls to the bottom of the extracting tank 25. After some time the bees that worked in the destruction of cappings in the extracting tank 25 will go up to the deposit super and the elements 26 are closed again.

The wax powder of the capping that has fallen to the bottom of the extracting tank 25 will be carried down by the disattracted honey in the next occasion. The slot 40 that is situated in the upper part of the semi-cylindrical cover 39 is used for the passing of bees from the deposit super to another super that can be placed if desired on top of this one.

I claim:

1. A honey extracting device for use on a bee hive comprising a super, a shaft rotatably supported through said super, a plurality of spaced apart circular frames each filled with combs and supported upon said shaft for rotation therewith and comb decapping means positioned adjacent the comb ends of each frame for decapping part of the combs upon rotation of said frames.

2. A honey extracting device for use on a bee hive comprising a super, a shaft rotatably supported through said super, a plurality of spaced apart circular frames each filled with combs and supported upon said shaft for rotation therewith, a plurality of substantially rectangular sheet elements connected to said super and positioned between said frames dividing said super into two chambers with said frames extending into both chambers with the upper chamber for producing honey and the lower chamber for extracting the honey, comb decapping means positioned in said lower chamber, and means for the entrance of bees to said upper chamber only.

3. A honey extracting device as claimed in claim 2 wherein the sheet elements on one side of said shaft are fixedly mounted and the sheet elements on the opposite side of said shaft are pivotal on their longitudinal axis and operating means extending through said super for pivoting said pivotal elements.

4. A honey extracting device as claimed in claim 2 wherein the sheet elements on one side of said shaft are fixedly mounted and the sheet elements on the opposite side of said shaft are pivotal on their longitudinal axis, said fixed elements having the form of two parallel semi-cylinders with the convex side placed upwards and positioned with the longitudinal sides thereof nearly touching said frames, and means for pivoting said pivotal elements.

5. A honey extracting device for use on a bee hive, comprising a super, a rotatable shaft extending through said super, a plurality of frames for supporting combs and fixedly mounted on and spaced apart along said shaft, a plurality of spacer elements supported by said super, cross beams supported by said elements and extending between said frames for supporting said shaft, a plurality of substantially rectangular sheet elements positioned in said super for dividing the same into two chambers and supported upon said spaced elements, an extracting tank positioned between said spacer elements in the lower of said chamber and encasing said frames for forming an extracting chamber, and means for barring or admitting the entrance of bees between said spacer elements to the upper of said chambers as desired.

6. A honey extracting device as claimed in claim 5 wherein said barring means consists of a pair of rods rotatably mounted on said spacer elements parallel to and each on an opposite side of said shaft, and a plurality of stems fixed to and extending perpendicular from each of said rods into the spaces between said spacer elements for preventing the passage of bees when desired to the upper of said chambers.

7. A honey extracting device as claimed in claim 5 wherein an uncapping device is positioned adjacent said frames in said extracting chamber for uncapping combs passing thereby upon rotation of said frames.

8. A honey extracting device as claimed in claim 5 wherein a thin electrical resistance wire is positioned adjacent to and extends across said frames in said extracting chamber and a source of electrical current is connected to said wire.

GENJI SUGANO.

REFERENCES CITED

The following references are of record in the file of this patent:

UNITED STATES PATENTS

| Number | Name | Date |
|---|---|---|
| 2,223,561 | Garriga | Dec. 3, 1940 |

FOREIGN PATENTS

| Number | Country | Date |
|---|---|---|
| 33,127 | Sweden | July 3, 1912 |
| 436,216 | Germany | Oct. 26, 1926 |